W. E. COFFIN.
WASHER.
APPLICATION FILED MAR. 31, 1908.

951,766.

Patented Mar. 8, 1910.

WITNESSES
R. H. Balderson
G. B. Bluming

INVENTOR
Walter E. Coffin
by Bakewell, Byrnes Parmelee
his Attys

UNITED STATES PATENT OFFICE.

WALTER E. COFFIN, OF CLEVELAND, OHIO, ASSIGNOR TO THE NATIONAL MALLEABLE CASTINGS COMPANY, OF CLEVELAND, OHIO, A CORPORATION OF OHIO.

WASHER.

951,766.  Specification of Letters Patent.  Patented Mar. 8, 1910.

Application filed March 31, 1908. Serial No. 424,302.

*To all whom it may concern:*

Be it known that I, WALTER E. COFFIN, of Cleveland, county of Cuyahoga, and State of Ohio, have invented a new and useful Improvement in Washers, of which the following is a specification, reference being had to the accompanying drawing, in which—

Figure 1:
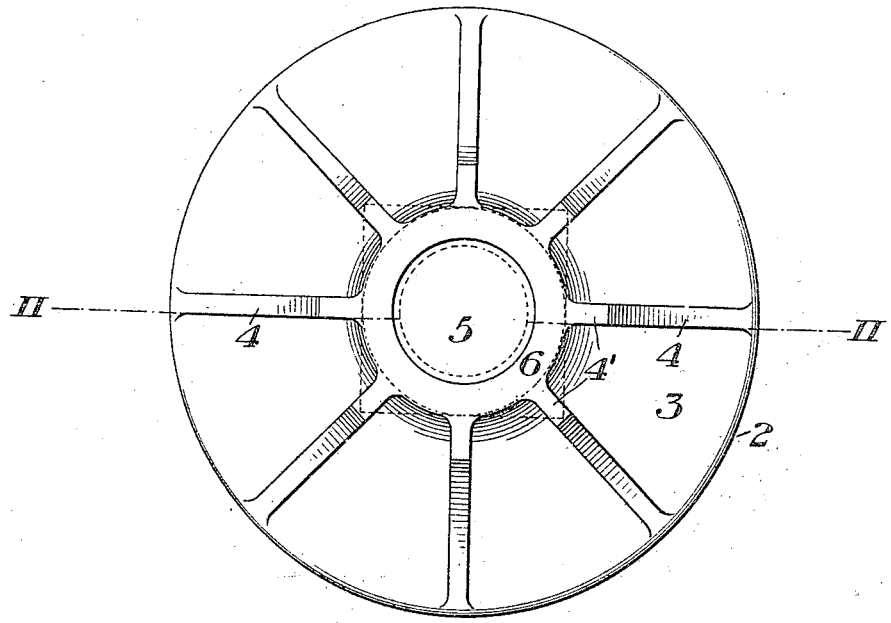
Figure 2:
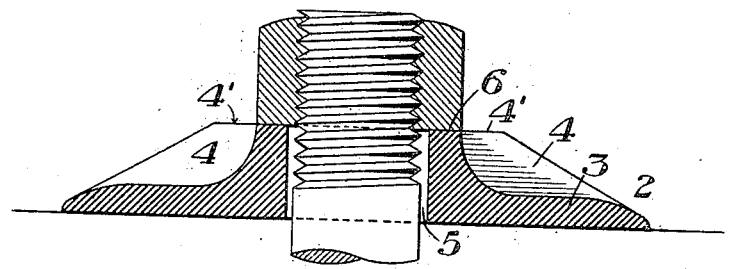

Figure 1 is a plan view of the washer, the position of the nut thereon being indicated by dotted lines. Fig. 2 is a vertical cross section on the line II—II of Fig. 1 showing the washer and nut in conjunction.

As shown in the drawing of the washer, 2 is a cast washer, preferably a malleable iron casting, having a broad base 3 with strengthening ribs 4 which extend radially on the washer. The washer has the usual central hole 5 and around this hole on top of the washer is a flat bearing surface 6, preferably annular in form, and the portions of the ribs 4 which are contiguous to the bearing surface 6 and which are marked 4' are also made flat on the top on the same level with the annular portion 6. When the nut is screwed home on the washer it will have a flat bearing on the annular surface 6 the diameter of which is preferably about equal to the shortest width of the nut. The diagonal dimensions of the nut project beyond the annular bearing surface 6, thus having a bearing upon the flat ribbed portions 4'. In this way the nut has a substantial bearing upon the washer and the washer is made of the greatest possible strength compatible with the weight of the material used in its construction. If desired, the radius of the annular bearing surface 6 may be somewhat less than the shortest width of the nut, but the construction which I have shown in the drawing is preferable.

I claim:

A washer having its bolt opening surrounded by a single circular flange whose edge forms a flat bearing surface for the shorter dimension of the nut, and integral radial ribs extending outwardly from said flange, the inner end portions of the ribs being flat extensions of the flange bearing and in the same plane for a distance sufficient to engage the longer dimension of the nut and form the sole bearing for its corners, and thence tapered downwardly toward the washer body; substantially as described.

In testimony whereof, I have hereunto set my hand.

WALTER E. COFFIN.

Witnesses:
HENRY F. POPE,
HARRY E. ORR.